United States Patent [19]
Hull

[11] 3,854,543
[45] Dec. 17, 1974

[54] AUXILIARY DRIVEN AXLES
[75] Inventor: Charles Hartley Hull, Huddersfield, England
[73] Assignee: David Brown Tractors Limited, Huddersfield, England
[22] Filed: May 8, 1973
[21] Appl. No.: 358,276

[30] Foreign Application Priority Data
May 24, 1972   Great Britain..................... 24551/72

[52] U.S. Cl............................................. 180/14 A
[51] Int. Cl................................................ B60d 7/00
[58] Field of Search..... 180/14 R, 14 A, 14 E, 14 D

[56] References Cited
UNITED STATES PATENTS
| | | | |
|---|---|---|---|
| 2,630,871 | 3/1953 | Simpkins............................ | 180/14 A |
| 3,227,235 | 1/1966 | Budzich et al..................... | 180/14 A |
| 3,360,064 | 12/1967 | Budzich et al..................... | 180/14 A |

Primary Examiner—Stanley H. Tollberg
Attorney, Agent, or Firm—Norris & Bateman

[57] ABSTRACT

An auxiliary driven axle of a power driven vehicle or of a trailer for such a vehicle has optionally engageable hydrostatic drive means including a non-reversible variable-delivery pump on the driven side of the clutch for transmitting drive from the vehicle's power unit to its main driven axle, the pump having control means for automatically varying the rate of its delivery in inverse proportion to the pressure of its delivery. The pump drives two reversible fixed displacement hydraulic motor hub units connected hydraulically in parallel and installed in the respective wheels of the auxiliary driven axle, and valve means are provided for causing said units to function temporarily as pumps when the vehicle's brakes are applied.

13 Claims, 1 Drawing Figure

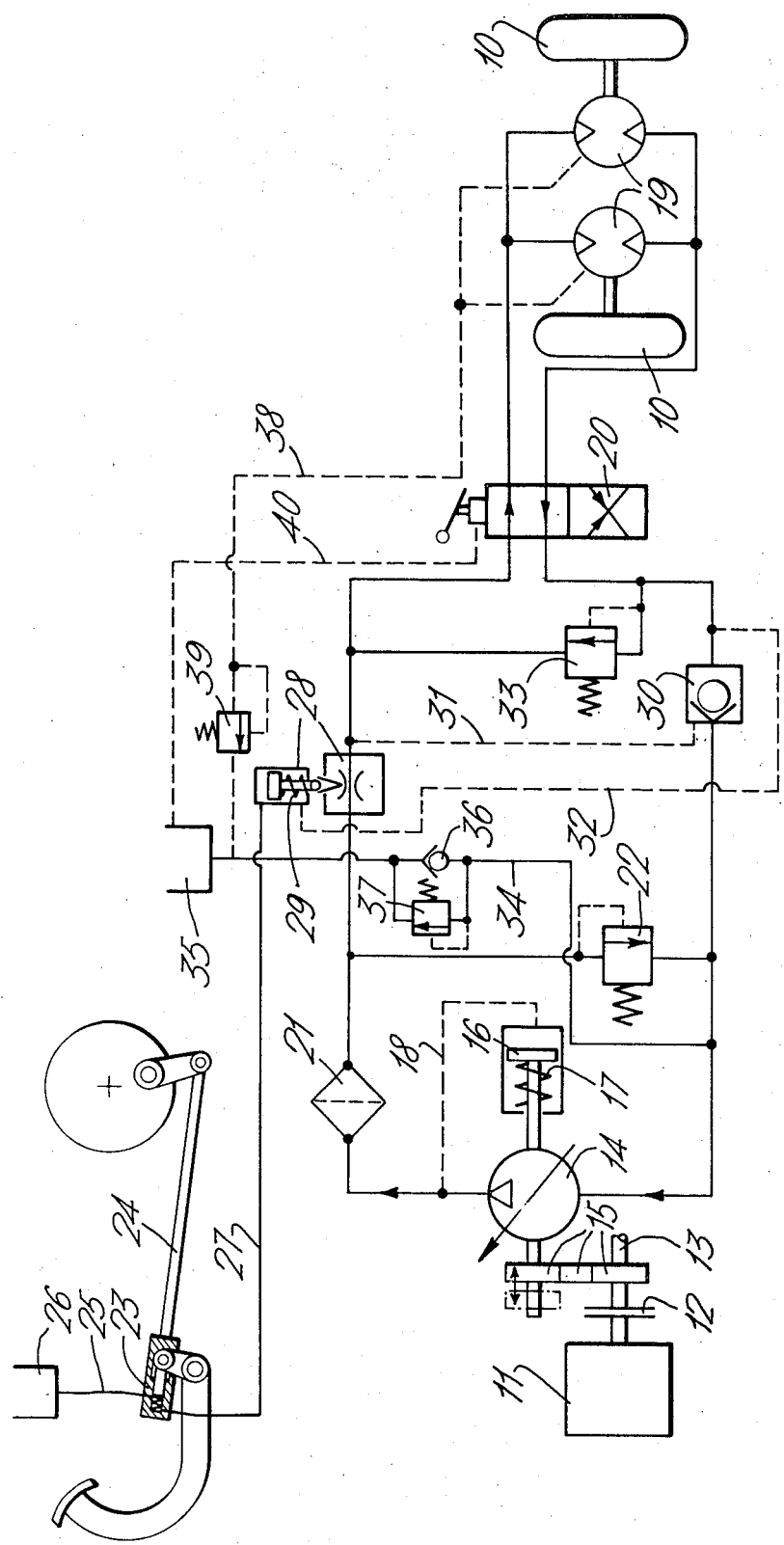

AUXILIARY DRIVEN AXLES

BACKGROUND OF INVENTION

The invention relates to an auxiliary driven axle of a power driven vehicle or of a trailer for such a vehicle.

The advantages of four-wheel-drive, particularly for off-the-road work, are well understood. In the case of a trailer which is appreciably heavier than the vehicle towing it, it is more efficient to apply some of the available tractive effort to the wheels of the trailer than to apply all of said effort to some or all of the wheels of the vehicle.

It is known to provide mechanical drive means for an auxiliary driven axle of a power driven vehicle or of a trailer for such a vehicle, the requisite power being derived from a power take-off shaft rotating at a speed proportional to the ground speed of the vehicle. Such a drive means has the disadvantages that it does not provide for the speed differential between the main driving wheels of the vehicle and the auxiliary driven wheels when negotiating curves; it does not provide for the speed differential between the main driving wheels of the vehicle and the auxiliary driven wheels when varied tyre diameters or tyres worn to differing degrees are employed; and there is difficulty in finding space to accommodate a drive-shaft extending forwardly beneath a power driven vehicle to an auxiliary driven front axle of said vehicle without appreciably reducing the ground clearance, or a drive-shaft extending rearwardly from beneath a power driven vehicle to an auxiliary driven axle of a trailer for such vehicle whilst avoiding, for example by passing above, the drawbars of the vehicle and its trailer. The two disadvantages concerning speed differential cause tyre scrubbing and loss of tractive efficiency.

It is also known to provide hydrostatic drive means for an auxiliary driven axle of a power driven vehicle or of a trailer for such a vehicle, wherein a fixed displacement pump driven from a shaft rotating at a speed proportional to the ground speed of the vehicle is connected in a closed circuit with two fixed displacement hydraulic motors driving the respective wheels of the axle. This arrangement transmits a fixed drive ratio and thus suffers from the same two disadvantages concerning speed differential as a mechanical drive.

The object of the present invention is to provide drive means for an auxiliary driven axle which avoid all the aforementioned disadvantages.

SUMMARY OF INVENTION

According to the invention, an auxiliary driven axle of a power driven vehicle or of a trailer for such a vehicle has hydrostatic drive means including a hydraulic pump driven at a speed proportional to that of the power unit of the vehicle with control means for automatically varying the rate of its delivery in inverse proportion to the pressure of its delivery.

BRIEF DESCRIPTION OF DRAWINGS

A preferred embodiment of the invention will now be described, by way of example only, with reference to the accompanying schematic drawing of hydrostatic drive means for the wheels of an auxiliary driven axle.

DESCRIPTION OF PREFERRED EMBODIMENT

Referring now to the drawing, in one form of the invention a power driven vehicle has two main driving wheels (not shown) on its rear axle and two auxiliary driving wheels 10 on its front axle. The main driving wheels are driven conventionally by the power unit 11 of the vehicle via a main power transmission clutch 12 and a gearbox having an input shaft 13, and the auxiliary driving wheels 10 are driven by hydrostatic drive means. Said means include a hydraulic pump 14 driven from the gearbox input shaft 13 by disengageable gearing 15 at a speed proportional to that of the power unit 11, and having control means for automatically varying the rate of its delivery in inverse proportion to the pressure of its delivery. In a simple form such a pump can comprise a reciprocating pump in which the or each cylinder head is loaded by a spring of appropriate rate so that as the delivery pressure increases the cylinder head retracts against the action of the spring to enlarge progressively the unswept volume of the cylinder during each delivery stroke and thus reduce the delivery rate. In the preferred form, the pump 14 is of non-reversible variable-delivery swash-plate type, the swash angle being automatically variable in known manner per se by a servo piston 16 urged in the maximum delivery direction by a spring 17 and moveable against the action of said spring by hydraulic fluid under pressure through a duct 18 from the delivery side of the pump 14. The pump is connected in a closed circuit with two hydraulic motor hub units 19 of reversible fixed displacement cam-guided radial piston type driveably installed in the respective auxiliary driving wheels 10, said units being connected hydraulically in parallel. Both the delivery side and the return side of the circuit pass through the reverse valve 20 actuated by the vehicle's gear shift lever and having alternative ahead and reverse positions in the latter of which the direction of flow through the motor hub units 19, and thus their direction of rotation, is reversed. A filter 21 is provided in the delivery side of the circuit, downstream of the duct 18 leading to the servo piston 16, and a maximum pressure relief valve 22 connects the delivery side of the circuit at a point downstream of the filter 21 to the return side of the circuit. A brake master cylinder 23 is interposed mechanically in the vehicle's brake rod 24, and is connected by a conduit 25 to a reservoir 26 and by a conduit 27 to a brake reaction valve 28 including a spring 29 interposed hydraulically in the delivery side of the circuit downstream of the maximum pressure relief valve 22. Application of the vehicle's brakes produces a pressure in the conduit 27 which acts against the spring 29 to cause the brake reaction valve 28 to throttle the flow of hydraulic fluid in the delivery side of the circuit. A counterbalance valve 30 associated as hereinafter described with the brake reaction valve 28 is interposed in the return side of the circuit upstream of the maximum pressure relief valve 22. The counterbalance valve 30 constitutes a pilot-operated-non-return valve arranged to prevent return flow from the motor hub units 19 to the pump 14 but normally held open to permit such flow by hydraulic fluid under pressure supplied to its pilot through a duct 31 from the downstream side of the brake reaction valve 28. A negative feedback to the brake reaction valve 28 is provided by a duct 32 from the upstream side of the counterbalance valve 30. A high pressure relief valve 33 connects the return side of the circuit, at a point between the counterbalance valve 30 and the reverse valve 20, to the delivery side of the circuit at a point between the reverse valve 20 and the brake reaction valve 28. A conduit 34 connects a header tank 35 to the return side of the circuit at a point between the counterbalance valve 30 and the pump 14, in order to maintain the circuit full of hydraulic fluid. The conduit 34 contains a non-return valve 36 arranged to prevent flow from the circuit to the tank 35, but a low pressure relief valve 37 is provided in parallel with said non-return valve. A drain conduit 38 containing a low pressure relief valve 39 connects those ends of the pistons adjacent the guide cam surfaces of the motor hub units 19 to the conduit 34 between the header tank 35 and the non-return valve 36, and a drain conduit 40 connects the reverse valve 20 directly to the tank 35.

In operation, for forward travel the hydraulic fluid is forced at high pressure by the pump 14 through the filter 21, the open brake reaction valve 28 and the reverse valve 20 which occupies its ahead position to the two motor hub units 19, from which it returns at low pressure to the pump 14 via the reverse valve 20 and the counterbalance valve 30 which is held open by the high pressure of the hydraulic fluid supplied to its pilot through the duct 31 from the downstream side of the brake reaction valve 28. For reverse travel the hydraulic fluid is circulated in the same manner except that it flows through the motor hub units 19 in the opposite direction due to the reverse valve 20 occupying its reverse position. When the vehicle's brakes are applied during forward or reverse travel, the brake reaction valve 28 throttles the flow of hydraulic fluid from the pump 14 to the motor hub units 19. The resultant increase in pressure upstream of the brake reaction valve 28 causes the servo piston 16 to reduce the rate of delivery of the pump 14, while the resultant decrease in pressure downstream of the valve 28 permits the counterbalance valve 30 to close. Thus the pressure upstream of the motor hub units 19 becomes less than the pressure downstream thereof, and said units function temporarily as pumps with a consequent braking effect additional to the normal braking of the vehicle. The negative feedback to the brake reaction valve 28 due to the high pressure temporarily prevailing at the upstream side of the counterbalance valve 30 acts on the brake reaction valve 28 via the duct 32, in the same direction as the spring 29, to moderate the throttling action of the last-mentioned valve. If the auxiliary driving wheels 10 overrun the power unit 11 the intake rate of the motor hub units 19 is greater than the maximum delivery of the pump 14 and the pressure in the circuit collapses. The pistons of the motor hub units 19 then operate out of contact with their guide cam surfaces with a reduced stroke which, but for the provision of the relief valve 39, would permit them to make undesirable free movement. However, said valve maintains a predetermined low pressure on those ends of said pistons adjacent their guide cam surfaces, in order to prevent such free movement.

In another form of the invention, a power driven vehicle has a trailer with two auxiliary driving wheels on its axle. Said wheels are driven by hydrostatic drive means exactly like those hereinbefore described in connection with said one form of the invention, except that the delivery and return sides of the circuit each include a flexible hose and quick-release self-sealing coupling between the motor hub units 19 and the reverse valve 20, and the drain conduit 38 likewise includes a flexible hose and a quick-release self-sealing coupling between the units 19 and the relief valve 39.

In one modification, the motor hub units 19 are connected hydraulically in series instead of in parallel, and in another modification said units are connected hydraulically in parallel over the lower speed range and in series over the higher speed range. In both of said modifications, a differential valve is interposed in the series connection between the motor hub units.

Where the power driven vehicle is an agricultural tractor the auxiliary driven axle's hydrostatic drive means are quite independent of the tractor's hydraulic power lift mechanism, hydraulic brakes and power steering, and of its power take-off shaft. Where said axle is on a trailer, the latter term includes lime spreaders, harvesting machines and the like. The principle of operation is, however, applicable broadly to many types of vehicle drives, for example the auxiliary front wheel drives of industrial tractors with trailed dump trucks or of centre-pivot-steered vehicles, and the auxiliary driven axles of multi-axle and articulated road vehicles generally.

Hydrostatic drive means according to the invention have the significant advantage that they automatically divert a pre-arranged fixed proportion of the available power at all speeds of the vehicle's power unit and in all ratios of the vehicle's gearbox to the auxiliary driving wheels.

What I claim is

1. An auxiliary driven axle of a power driven vehicle or of a trailer for such a vehicle having hydrostatic drive means including a hydraulic pump driven at a speed proportional to that of the power unit of the vehicle with control means for automatically varying the rate of its delivery in inverse proportion to the pressure of its delivery.

2. An auxiliary driven axle according to claim 1, wherein the hydrostatic drive means include two fixed displacement hydraulic motor hub units drivably installed in the respective wheels of said axle and connected in a closed circuit with the pump.

3. An auxiliary driven axle according to claim 2 wherein the motor hub units are connected hydraulically in parallel.

4. An auxiliary driven axle according to claim 2, wherein the pump is non-reversible and the motor hub units are reversible, and a reverse valve is provided in the circuit for reversing the direction of flow through said units.

5. An auxiliary driven axle according to claim 4, wherein a brake reaction valve operative to throttle the flow is interposed in the delivery side of the circuit and a counterbalance valve for preventing the flow when the brake reaction valve is operative is interposed in the return side of the circuit.

6. An auxiliary driven axle according to claim 5, wherein a negative feedback is provided between the upstream side of the counterbalance valve and the brake reaction valve.

7. An auxiliary driven axle according to claim 5, wherein a high pressure relief valve is provided between the upstream side of the counterbalance valve and the downstream side of the brake reaction valve.

8. An auxiliary driven axle of a power driven vehicle or of a trailer for such a vehicle having optionally engageable hydrostatic drive means including a non-reversible variable-delivery hydraulic pump on the driven side of the clutch for transmitting drive from the vehicle's power unit to its main driven axle, the pump having control means for automatically varying the rate of its delivery in inverse proportion to the pressure of its delivery and driving two reversible fixed displacement hydraulic motor hub units connected hydraulically in parallel and installed in the respective wheels of the auxiliary driven axle, and valve means for causing said units to function temporarily as pumps when the vehicle's brakes are applied.

9. An auxiliary driven axle according to claim 2, wherein the motor hub units are of cam-guided piston type and a low pressure relief valve is provided in a drain conduit communicating with those ends of the motor pistons adjacent their guide cam surfaces.

10. An auxiliary driven axle according to claim 8, wherein the motor hub units are of cam-guided piston type and a low pressure relief valve is provided in a drain conduit communicating with those ends of the motor pistons adjacent their guide-cam surfaces.

11. An auxiliary driven axle according to claim 1, wherein a maximum pressure relief valve is provided between the delivery and return sides of the pump.

12. In a power driven vehicle assembly having hydraulic braking means actuated by the vehicle driver and comprising a main driving axle connected to be driven by a power plant and an auxiliary driving axle adapted to be driven from said power plant through a hydrostatic drive, said hydrostatic drive comprising a variable delivery pump driven from said power plant and connected by a closed hydraulic circuit to hydraulic motor means at said auxiliary driving axle, valve means in the delivery side of said circuit operable in response to application of the vehicle brakes by said hydraulic braking means to restrict flow of hydraulic fluid in said delivery side of the circuit and thereby decrease fluid pressure in the circuit between said valve means and said motor means, and means responsive to said decrease in pressure for increasing the fluid pressure in said circuit at the return side of said motor means, whereby the fluid pressure at the return side of said motor means exceeds that at the delivery side and said motor means is caused to operate as pump means augmenting braking of the vehicle assembly.

13. In a vehicle assembly as defined in claim 12, said variable delivery pump being non-reversible, said motor means comprising at least one reversible hydraulic motor, and there being a reversing valve in said circuit for reversing fluid flow through said motor.

* * * * *